United States Patent

[11] 3,524,434

| [72] | Inventor | Dallas L. Finley |
| | | Hayfield, Minnesota |
| [21] | Appl. No. | 696,076 |
| [22] | Filed | Jan. 5, 1968 |
| [45] | Patented | Aug. 18, 1970 |

[54] HOLDING DEVICE FOR RESTRAINING SMALL QUADRUPED ANIMALS TO FACILITATE TRIMMING, GROOMING AND OPERATING
2 Claims, 4 Drawing Figs.

| [52] | U.S. Cl. | 119/103 |
| [51] | Int. Cl. | A61d 3/00 |
| [50] | Field of Search | 119/103, 96, 102, 98 |

[56] References Cited
UNITED STATES PATENTS

| 2,773,477 | 12/1956 | Michael | 119/103 |
| 2,804,845 | 9/1957 | Plumley et al. | 119/102 |
| 3,092,079 | 6/1963 | Strebel et al. | 119/103 |
| 3,120,836 | 2/1964 | Brauning | 119/103 |
| 3,250,252 | 5/1966 | Leopold | 119/103 |
| 3,266,464 | 8/1966 | Davis | 119/103 |

*Primary Examiner*—Hugh R. Chamblee
*Attorney*—Williamson, Palmatier and Bains

ABSTRACT: A holding device for efficiently restraining smaller quadruped animals such as dogs and cats to facilitate trimming and other operations thereon. Essentially, the device combines with a horizontal support medium of an area to support animals varying in size in normal standing position, an anchored vertically and angularly adjustable abdominal supporting member having preferably a strap or other medium for encircling the torso of an animal and a head-restraining member also anchored to the horizontal support medium and disposed forwardly of the abdominal support member and including an adjustable neck-encircling and restricting element. An important feature of the invention provides for the positioning and complete restraint of the animal through adjustment of the supporting members to the end that the rear feet of the animal cannot be actuated to shift its position. With such restraining, a small quadruped animal may be held to readily permit clipping of its fur or hair, grooming of the animal or the performing of certain surgical operations thereon.

Patented Aug. 18, 1970

3,524,434

INVENTOR
DALLAS L. FINLEY
By Williamson, Palmatier + Bains
ATTORNEYS

HOLDING DEVICE FOR RESTRAINING SMALL QUADRUPED ANIMALS TO FACILITATE TRIMMING, GROOMING AND OPERATING

This invention relates to a compact and efficient holding device for quite completely restraining small quadruped animals such as cats and dogs to facilitate the trimming, grooming and surgical operations thereon. The invention has particular relationship to a simple mechanism which is rather widely adjustable for smaller animals varying considerably in size, and which will so encircle and restrain and at least partially support the torso of the animal in a position to prevent tractive effort on the part of the animal. More specifically, it is an object of my invention to provide a simple and efficient device of the class described, which may be dissembled for packaging or shipment in compact form, which makes provision for various adjustments to accommodate and restrain animals varying substantially in height and length, which when used properly will substantially immobilize the animal to readily permit trimming, grooming and surgical operation thereof.

A further object is the provision of a holding device of the class described wherein a support or deck for the various holding elements of my structure is also readily adjustable vertically to bring the animal into a position most adaptable for servicing by an operator.

These and other objects will be more fully apparent from the following description made in connection with the accompanying drawings wherein like reference characters refer to similar parts throughout the several views, and in which.

Figure 1:
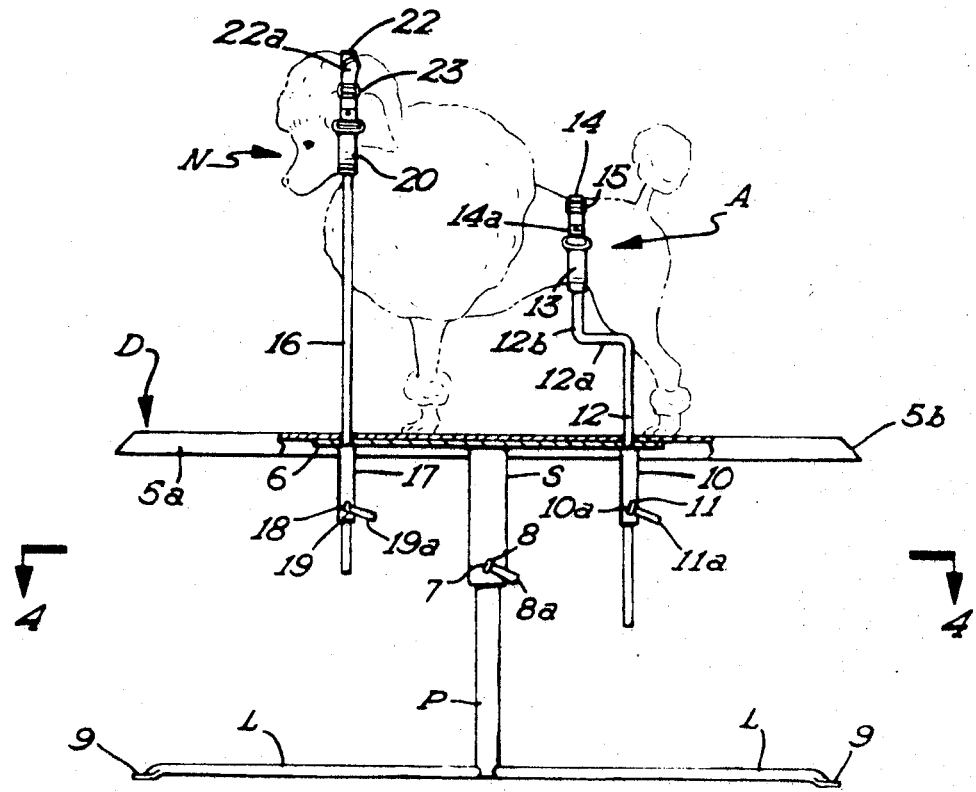
FIG. 1 is a side elevation of an embodiment of my invention adjusted for holding and effectively restraining an average sized poodle dog outlined in dotted lines thereon.

Referring now to the embodiment illustrated in the drawing, I preferably provide an independent deck or support medium D which may be constructed of sheet metal, plywood or other suitable relatively rigid material. The deck D as shown is constructed of smooth sheet metal having downturned side and end edges 5a and 5b, respectively, for strengthening and appearance purposes. The deck D as shown is further reinforced by a longitudinally and centrally extending strip or bar 6 which, at spaced points, may be spot welded or otherwise secured to the underside of the deck proper D.

A depending slide sleeve S is rigidly affixed as by welding to the center and underside of deck D extending perpendicularly thereto and having a radial set screw opening 7 tapped therethrough. A set screw 8 threadedly engages the opening 7 and, as shown, has a lever handle 8a affixed thereto.

Figure 4:
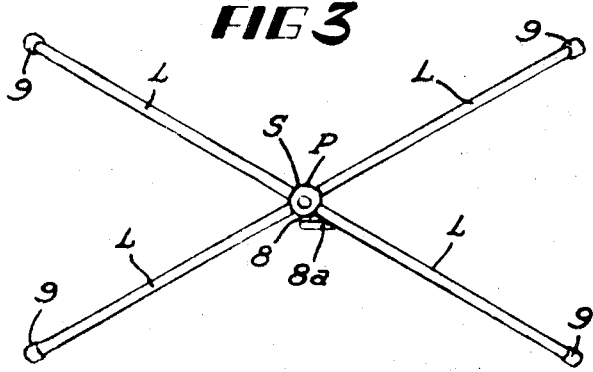
FIG. 4 is a section on the line 4—4 of FIG. 1.
Figure 2:
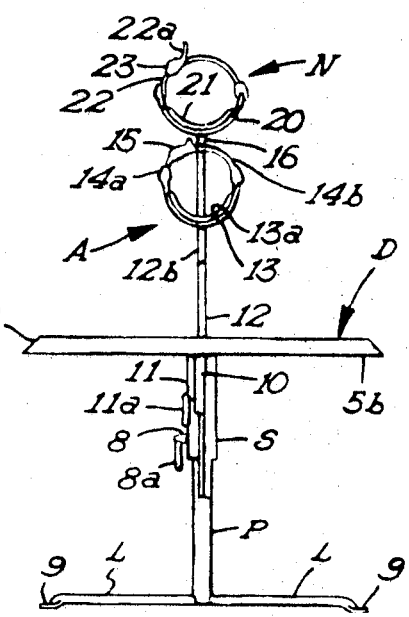
FIG. 2 is a rear elevation of the same.

Sleeve S is adapted to adjustably receive an internally telescoped post P which has affixed thereto a plurality of supporting legs L. The legs L, as shown, are four in number and extend substantially radially from the post P affixed thereto at their inner ends as by welding and forming, as shown in FIG. 4, a rather narrow configuration of maximum dimensions to fit within the confines of the bottom of the top deck D for packaging. Legs L preferably have flat extremities 9 for giving greater contact area with a floor or other natural supporting surface such as a table.

A socket tube 10 is affixed to deck D centrally thereof and rearwardly of sleeve S, the upper end of said tube 10 extending through an aperture formed in said deck and being rigidly secured to deck D as by welding and extending perpendicularly thereto. A radially set screw opening 10a is tapped in the intermediate portion of tube 10 to threadedly receive a set screw 11 carrying a lever handle 11a.

An abdominal engaging and supporting member indicated as an entirety by the letter A is adjustably anchored in socket tube 10, comprising a vertical elongate shank 12 having telescopic fit with the tube 10 and carrying at its upper portion a generally U-shaped abdominal yoke 13, which is shown as arcuate in shape and has affixed thereto a similarly shaped cushioning member 13a which may be constructed of compressible material such as foam rubber. It will be understood that the abdominal engaging member A may be adjusted for various heights within the tube socket 10 and may be also angularly adjustable and tightly locked to the tube by use of the set screw 11.

For greater variable adjustment in the positioning of the member A, it will be noted from FIG. 1 that at the top of shank 12, an angle arm 12a extends in integral fashion, which angle arm terminates in a short upstanding shank 12b, having affixed to the upper end thereof the yoke 13. Thus, the member A may be disposed in the opposite positions shown in FIGS. 1 and 3 to give greater variance for the embracing and support of animals varying substantially in length.

Closely cooperating with the yoke 13 is an encircling medium as shown in the form of a flexible strap 14, having one end 14a connected with one upstanding end of yoke 13 and having the opposite or free end 14b provided for cooperation with a buckle or equivalent retaining device 15 affixed to the upper extremity of the other arm of the yoke. The strap is elongate to enable it to variably encircle the torso of smaller quadruped animals varying considerably in size.

Cooperating with the abdominal supporting member A is a forwardly disposed neck-restraining member indicated as an entirety by the letter N and comprising a rod shank 16 adapted to be telescopically mounted in a depending tube socket 17 extending forwardly of the sleeve S in spaced relation thereto and welded or otherwise rigidly secured through the deck D. Tube 17, like tube 10, has a set screw aperture 18 tapped therethrough to receive a set screw 19 having a torque arm 19a affixed thereto.

Neck-restraining member N has a rather shallow yoke 20 affixed centrally to the upper end of shank 16, and like 13, has an arcuate cushioning member 21 affixed thereto. At one end of yoke 20, an elongate flexible element such as a flat strap 22, is secured while the opposite or free end 22a of the strap is adapted to be cooperatively associated with a buckle or equivalent member 23 affixed to the opposite end of yoke 20. The anchored yoke and its strap are adapted to very snugly encircle the neck of a smaller domestic animal, anchoring and restraining the neck and head of the animal to prevent turning, lifting or lowering of the neck. It will be understood that the member N is adjustable for angular positioning as well as for height through the media of socket tube 17, shank 16 and the set screw 19.

Figure 3:
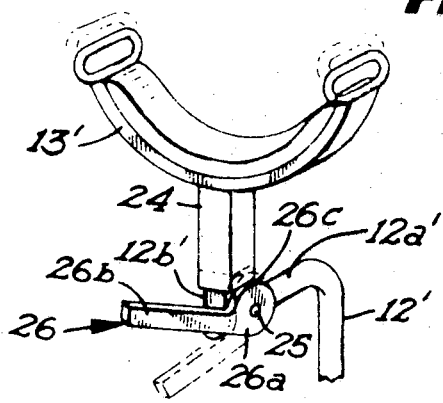
FIG. 3 is a detail side elevation of the abdominal support member disposed in a quite different adjusted position as contrasted with its position in FIG. 1 and also illustrating a body-elevating mechanism which may be operated readily after the animal has been initially disposed upon the device.

Referring now to FIG. 3, an additional feature is disclosed which permits a secondary elevation of the abdominal restraining member after original positioning of the animal thereon.

To this end, the yoke 13 is provided with a central, depending tubular sleeve 24 rectangular internal cross section for slidably fitting and being supported upon the upstanding short shank 12b' of a semi-modified shank member 12'. The short shank 12b is also rectangular cross section to slidably fit sleeve 24. The offsetting arm portion 12a' of the modified shank 12' is provided with a rigid pivot pin 25 projecting laterally from one side thereof. On pivot pin 25 is mounted the short end 26a of a lifting lever 26 having an integral actuating handle 26b. The short end 26a of the lever is provided with a rounding camming surface 26c which merges with a flatted portion adapted to engage the undersurface of the yoke 13' when the lever is swung to the dotted line position, thereby elevating the yoke and, of course, the abdomen of the animal for a short distance of about one-half inch.

OPERATION AND USE

In use, it is often desirable to first adjust the height of the supporting deck D relative to the legs L so that the attendant or operator when sitting on a chair or stool can have the animal disposed at the most convenient height for trimming, for grooming or for performing certain surgical operations. Thereafter, the operator will gently position the dog or other animal to be treated upon the supporting deck with the members N and A preliminarily adjusted in most instances. The animal is caused to stand on its four legs whereafter the confining strap 22 and yoke 20 are first applied to snugly encircle the neck and back of the head of the animal as shown in FIG. 1, and the strap is secured by its buckle 23. Thereafter, the strap on the yoke 13 is rather tightly drawn about the back of the animal, forwardly of the rear legs and secured to its cooperating buckle 15.

It should be mentioned that the deck D is purposely made smooth and fairly slippery so that tractive effort on the part of the animal is very restricted.

It will be seen that height adjustments of both the abdominal supporting member and the neck supporting member may be readily made by the operator by merely releasing the respective set screws 11 and 19, and the heights readjusted as may be desirable.

It is often desirable before trimming or other operations on the animal, to slightly elevate the abdominal member a short distance sufficient to substantially take the weight of the body off of the hind legs. Dangling of the legs is not desired.

When so restrained by the cooperating elements of my device, the animal cannot appreciably turn its neck or head, cannot produce tractive efforts with its front or rear legs, and cannot substantially twist its torso or interfere with operations through movement of its hind legs.

For certain medicinal and surgical treatments or operations it may be desirable to twist the neck, head, torso or rear end of the animal in one direction or in the opposite direction. To such ends the neck-restraining and abdominal-supporting members N and A may be angularly adjusted and set as desired through the media of their shanks and cooperating set screws.

From the foregoing it will be seen that I have provided a simple, highly efficient and compact restraining holder for the purposes intended which will give an operator the greatest freedom without interference for trimming, grooming or otherwise operating on a small, quadruped domestic animal such as a dog or cat varying rather widely in size and height.

With reference to FIG. 1, when a considerably longer animal is to be restrained the positioning of the shank 12 may be reversed with the horizontal arm 12a extending rearwardly, thereby positioning the cradle yoke 13 several inches rearwardly of the position shown in FIG. 1. It of course will also be understood that the heights of the members N and A may be quite substantially varied in accordance to the need, dimensions and height of the animal to be restrained.

With further reference to FIG. 3, it will be repeated that after initial positioning of the animal when it is desired to dangle the rear legs thereof or substantially dangle the same, the elevated lever 26 may be swung from the full line position of FIG. 3 to the dotted line position, thereby elevating the yoke 13' about one-half inch.

It further should be understood that with the structure as disclosed the device may be compacted with the post P fully telescoped within the slide sleeve S leaving the deck to form a compact package for shipment or storage in a compact container.

It will of course be understood that various changes may be made in the form, details and specific elements used, all within the scope of my invention as defined more clearly in the appended claims.

I claim:

1. In a holding device for restraining smaller quadruped animals to facilitate trimming and other operations thereon,
    the combination with a substantially horizontal support medium of an area to support such animals, varying substantially in size, in a normal standing position,
    a neck-restraining member anchored to the forward portion of said support medium and mounted for adjustment in the height thereof,
    a torso-supporting unit detachably anchored to said support medium and disposed rearwardly of said neck-restraining member and having a yoke for underlying the torso of the animal, said yoke having a depending stem,
    a support shank having an upper vertical end slidably and non-rotatably receiving said yoke-stem,
    said shank having a lower upstanding end affixed to said horizontal support for vertical adjustment thereon,
    and said shank further having an intermediate arm connecting the lower end thereof with the upper end thereof in horizontally offset relation,
    the lower end of said shank being rotatably connectible with said support medium providing at least two positions of the torso-supporting unit whereby the intermediate arm of said shank is directed substantially toward and away from the neck-restraining member in a common plane with the lower end of said shank and the anchor connection of said neck-restraining member whereby the holding device is relatively widely adjustable for animals varying substantially in length.

2. The structure set forth and defined in Claim 1 further characterized by,
    a lift arm yoke-elevating member pivoted to said intermediate arm of said shank below said yoke-stem and having a camming element engaging the extremity to said stem to produce a limited, predetermined elevation of said yoke sufficient to produce at least partially dangling of the animal's legs after primary adjustment of the holding device with the animal confined and standing on said support medium upon its own feet.